WITNESSES
Edwin E. Bassler
James F. Young

INVENTOR
Juris A. Asars
BY
Benjamin De Witt
ATTORNEY

United States Patent Office 3,018,412
Patented Jan. 23, 1962

3,018,412

ELECTRICAL SYSTEMS EMPLOYING NONLINEAR DIELECTRIC CAPACITIVE ELEMENTS

Juris A. Asars, Monroeville, Pa., assignor to Westinghouse Electric Corporation, East Pittsburgh, Pa., a corporation of Pennsylvania Filed Mar. 4, 1960, Ser. No. 12,712
13 Claims. (Cl. 315—166)

This invention relates to electrical control systems employing nonlinear dielectric capacitive elements and more particularly relates to apparatus for distributing control or intelligence bearing signals from a single source to a plurality of nonlinear dielectric charge storage elements and for utilizing the signal portions stored by such elements to control delivery of power to load elements.

While the present invention may find application in various systems for utilizing intelligence bearing signals to perform control functions, it has particular utility in connection with space distributed display of visual indicia such as in the display of television, radar, facsimile, and the like images. For convenience the invention is hereafter described in the particular embodiments which have been found most suitable for display of video signals in television-type apparatus. It is, of course, to be expressly understood that the invention may have broad application in various control systems other than television, and its application is not restricted to any particular system.

In U.S. Patent No. 2,875,380, issued February 24, 1959, to Pierre M. G. Toluon and assigned to the same assignee as the present application, there is disclosed an image display apparatus or screen which may comprise thousands of separate, spatially distributed electroluminescent light producing elements each having associated therewith at least one variable reactance device adapted to vary the electric field applied across the electroluminescent body under the control of an applied electrical force. In the particular embodiment there disclosed the variable reactance device for controlling the electroluminescent cell takes the form of a non-linear dielectric capacitive element or capacitor which utilizes a dielectric material such as barium titanate or barium strontium titanate. Such capacitive elements are responsive to a control signal or control potential applied thereto to govern the total impedance seen by the source of alternating current power, and hence to govern the power delivered to and the light emitted from each electroluminescent element.

In the use of such display screens for television, radar, and the like systems, it is necessary to provide high speeds switching means for distributing intelligence bearing signals from a common control signal source to a large plurality of individual channels extending to the separate nonlinear dielectric capacitive elements. In conventional television systems, the discrete video signals for controlling the brightness of separate picture elements of a display are received as time sequential elementary components of the video wave. At the display screen it is desirable that light be emitted continuously from each picture element during a whole frame time, in proportion to the instantaneous amplitude value of the video wave component corresponding to the desired brightness of the particular element. By arranging for storage of a signal corresponding to the instantaneous value of the video wave, it is possible to substantially increase the average brightness of the display and to substantially eliminate flicker of the type which has heretofore been inherent in cathode ray type image display systems.

To accomplish the foregoing, a potential corresponding to a discrete time sequential portion of the video signal may be stored instantaneously, retained during the picture frame time and then erased or dissipated to enable storage of a second potential corresponding to the desired brightness of the same picture element during the next subsequent frame time. One known method of obtaining continuous light output from a discrete picture element is to provide switching means for storing an instantaneous potential on a conventional capacitor, transfer the stored potential by way of a decoupling resistor or other decoupling circuit means, and utilize the transferred potential to continuously bias a nonlinear dielectric capacitive element. The control reactance of the capacitive element as determined by the bias potential applied thereto is utilized to control the periodic current power applied to an elementary portion of the electroluminescent screen.

One example of such a signal distribution and storage system is disclosed in copending application Serial No. 747,799 of Francis T. Thompson, filed July 10, 1958 and assigned to the same assignee as that of the present invention. Systems of the general type disclosed in the Thompson application have the advantage that each picture element is continuously energized for the entire picture frame time, and have the additional advantage that the power utilized to produce light is provided by an alternating current or other periodic current power source and is not drawn from the source of video control signal. The video control signal source is only required to control the average electric field applied to the nonlinear dielectric capacitive elements. Such control is accomplished by recurrently charging the separate conventional storage capacitors to potentials corresponding to the different amplitudes of the different sequential portions of the control signal. However, such systems have the disadvantage that the separate conventional storage capacitor must be an order of magnitude larger than the nonlinear capacitive elements which are to be biased thereby. Such large capacitance requires the provision of substantial control signal power to accomplish high speed charging and requires a source of switching pulses capable of providing substantial pulse power. Typical previously known charge storage circuits have required, for each picture element, a pair of switching diodes, a storage capacitor, and a decoupling resistor in addition to the nonlinear capacitive element and the electroluminescent element of each elementary portion of the image screen. Heretofore, arrangements of the type described have been excessively complex, bulky and expensive and have required undesirably large quantities of control signal power to successively charge the large plurality of undesirably large control signal storage capacitors.

Accordingly, it is a primary object of this invention to provide an electrical control system embodying nonlinear dielectric capacitive elements which, per se, serve as means for storing charges corresponding to selected portions of a time varying control signal.

It is another object of the present invention to provide an improved electrical system, employing nonlinear dielectric capacitive elements, whereby delivery of periodic current power to a load means can be controlled in accordance with selected portions of a control signal which varies in amplitude as an analog function of intelligence, and whereby a minimum loading is imposed on the source of intelligence bearing control signal.

It is another object to provide a signal storage arrangement employing at least one nonlinear dielectric capacitive element, in which potentials for controlling the impedance of the element are stored directly by the capacitance thereof so that no separate potential storage device is required.

It is an additional object of the invention to provide a signal storage arrangement utilizing at least one nonlinear dielectric capacitive means and exhibiting the property of storing control potentials which are amplified versions of an input control signal with the amplification characteristic being dependent upon the degree of nonlinearity of the nonlinear dielectric capacitive element.

It is another object of the invention to provide an improved signal distribution system for applying oscillating current from a common source to a plurality of separate load elements with the relative current amplitude applied to the respective load elements being controlled in accordance with selected time sequential portions of a multi-valued intelligence analogous control signal.

It is another object of the invention to provide an electrical system of the type described which requires a minimum number of circuit components and a minimum of complexity.

It is another object of the invention to provide for recurrently adjusting the reactance of a nonlinear dielectric capacitive element directly in response to an instantaneous amplitude of a variable amplitude control signal and to provide for maintaining the reactance substantially at the adjusted value during the time intervals between recurrent readjustments.

It is a final object of the invention to provide an improved type of image display system utilizing a plurality of spatially arrayed electroluminescent elements and utilizing a plurality of signal storage networks for differentially controlling the power applied to the different electroluminescent elements.

In general, the foregoing objects and purposes of this invention are accomplished by the provision of an electroluminescent element and a nonlinear dielectric capacitive element associated with the electroluminescent element. The nonlinear capacitive element exhibits an alternating current impedance which varies as a function of applied electric field and thereby controls delivery of power to the load means. An intelligence analogous control signal, such as the video signal derivable from a television receiver or radar receiver, is recurrently applied to the nonlinear capacitive element by way of a nonlinearly conductive switching means which is normally biased to a nonconductive condition. Time spaced pulse signals are recurrently employed for rendering the switching means conductive to charge the nonlinear capacitive element to an average potential corresponding to the instantaneous amplitude of the control signal.

In previously known systems, control potentials were stored on separate conventional capacitors which, in turn, charged the nonlinear dielectric capacitive elements through decoupling resistors or other decoupling circuits. In such previously known systems the separate conventional linear storage capacitors had to be an order of magnitude larger than the nonlinear dielectric capacitive elements. In the method of the present invention, intelligence representative potentials are established directly on the nonlinear dielectric capacitive elements by limiting the maximum or minimum instantaneous potentials of the periodic current voltage appearing across the nonlinear capacitive element during the charging interval.

The foregoing and other objects and advantages of this invention will be appreciated from consideration of the following description taken with the accompanying drawing, throughout which like reference characters indicate like parts, which drawing forms a part of this application and in which.

Figure 1:
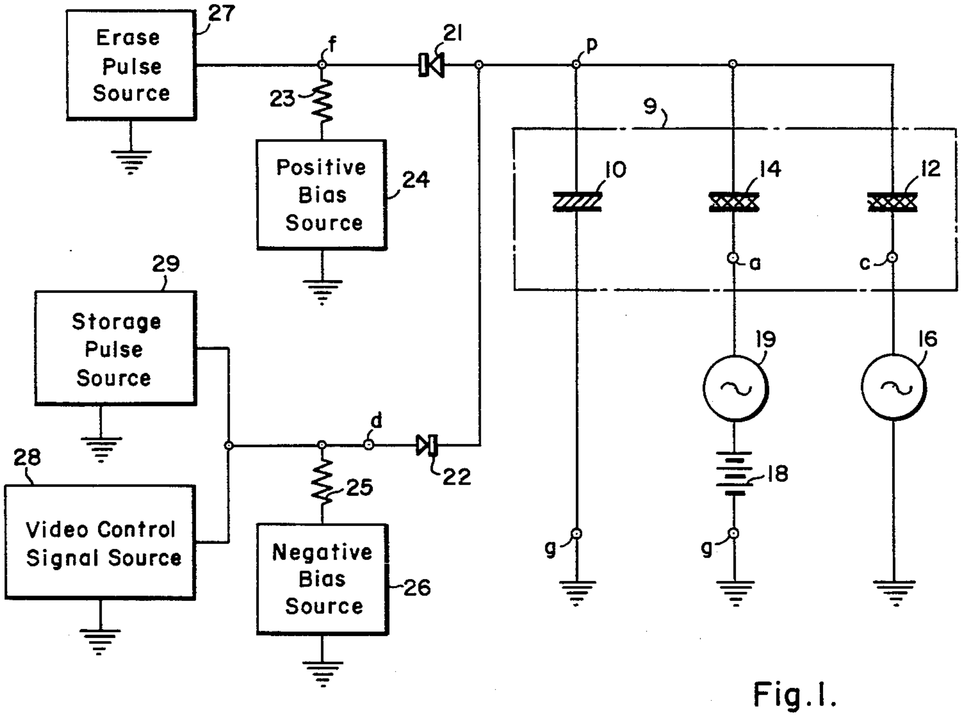
FIGURE 1 is a schematic diagram partially in block form of an electrical control system in accordance with the present invention.

All of the circuit arrangements set forth by the foregoing figures are provided as examples only, without any restricted or limiting intent as to the scope of the present invention. In FIGURE 1 there is shown the essential components of a basic switching and storage network for controlling the light produced by a single electroluminescent element 10 in accordance with selected time sequential portions of an intelligence bearing signal from a signal source 28. It is to be understood that the circuit of FIG. 1 when utilized in a spatial array display screen is partially duplicated or repeated for each electroluminescent cell or discrete element of the display screen. A set of components including diodes 21 and 22, the EL cell 10 and the nonlinear capacitors 14 and 12 is associated with each element at the display. The number of light elements 10 used in a display screen and the number of associated control elements will depend on the conditions to be met. It should be appreciated that thousands of light elements and associated control networks may be assembled into one image display system. Copending application Serial No. 747,799, aforementioned, discloses one display apparatus embodying electroluminescent elements arranged in rows and columns with each electroluminescent element being provided with switching and storage means for providing control of the energization of the electroluminescent elements. It is to be understood that the control system of the present application as shown in FIG. 1 may be applied in systems of the type set forth by the aforementioned copending application, in which case the circuit of the present FIG. 1 would be substantially duplicated for each and every separate electroluminescent element of the display screen. As shown in FIG. 1, one elementary portion 9 of a display screen comprises an electroluminescent cell 10 and a pair of nonlinear dielectric capacitive elements 12 and 14 having their first electrodes connected to one electrode of the electroluminescent cell 10. The other electrode of the electroluminescent cell 10 is connected to a point of reference potential *g* which may be ground.

The specific physical and chemical structure of electric electroluminescent display elements and screens is described in great detail in the aforementioned Toulon Patent No. 2,875,380. Accordingly, the structure of such electroluminescent cells and the associated nonlinear dielectric capacitive elements will not be set forth in detail herein. Such structural detail comprises no part of the present invention and it is to be understood that the nonlinear dielectric capacitive elements 12 and 14 of applicant's FIG. 1 may comprise, for example, dielectric members formed of ferroelectric material such as, barium titanate, barium-strontium titanate, barium stannate, sodium columbite, sodium tantalate, potassium tantalate and the like. It is to be understood that other known materials which exhibit variable capacitance as a function of the average applied potential may be utilized. For the purposes of the present invention, the term "nonlinear dielectric material" shall be taken as defining a material wherein the time varying component of electric displacement in a given principle direction is dependent upon the average value of electric field applied in the same direction. Accordingly, the term "nonlinear dielectric capacitive means" shall be taken as generically defining those devices, elements and systems of elements which have finite electrical capacitance and which exhibit the aforementioned applied electric field dependence characteristic.

The first electrodes of the nonlinear capacitive elements 12 and 14 are connected commonly to the point *p* and the upper terminal of electroluminescent cell 10. A first source 19 of periodic current power is connected serially with a source of biasing potential 18, between the point of reference potential *g* and the second electrode of capacitive element 14 at terminal *a*. A second source of periodic current power 16 is connected between the second terminal *c* of the other nonlinear capacitive element 12 and the point of reference potential *g*. The electroluminescent cell 10 emits light in accordance with the periodic potential appearing across it. The nonlinear capacitive elements 12 and 14 cause the potential applied to cell 10 to be controlled in accordance with the average or direct current potential at common terminal *p*. It is to be understood that the average or direct current potential $e_{pg}$ which is applied across cell 10 also appears across the electrodes of nonlinear capacitive element 12 and is applied additively with the potential of source 18 to the nonlinear capacitive element 14. As will be explained in more detail hereinafter, the periodic current potentials applied from sources 16 and 19 to electroluminescent cell 10 by way of capacitive elements 12 and 14 may be varied from substantially a zero level to a value approaching the peak-to-peak voltage of source 16. Such variation of the periodic potential applied to cell 10 may be accomplished by establishing the point *p* at different average or direct current potentials corresponding to the light intensity desired to be produced by the cell 10. To adjust the average potential at common terminal *p*, the capacitive elements 12 and 14 must be charged with a video control potential from a control signal source 28; the charge must be retained during one picture frame time and then abruptly changed to a charge corresponding to the desired brightness of the cell 10 for the following frame time.

To recurrently reestablish the average potential of point *p* in accordance with the picture frame rate, there is provided a high speed switching means comprising a pair of nonlinearly conductive diodes 21 and 22, associated bias voltage sources 24 and 26 for normally retaining the diodes 21 and 22 in nonconductive conditions and sources of time spaced voltage pulses 27 and 29 for recurrently applying pulses to render the diodes 21 and 22 temporarily conductive. Storage diode 22 has its cathode end commonly connected with the anode end of erasing diode 21 to the common terminal *p* of the electroluminescent unit. This anode of storage diode 22 is connected through a decoupling resistor 25 to the negative terminal of a source of direct current bias voltage 26. The positive terminal of bias source 26 is connected to the point of reference potential *g*. The anode of storage diode 22, designated by the terminal *d*, is further connected directly to a source of control signal 28 and to a source of recurrent positive going voltage pulses 29. The control signal supplied by source 28, by way of example, may be a video intelligence signal derived from the video amplifier of a conventional television receiver circuit.

For the purposes of the present invention it is to be understood that the pulse source 29 produces a single positive going pulse of predetermined amplitude and predetermined duration during each frame time. The phase relationship between the beginning of the frame time and the time of occurrence of the pulse depends on the relative position of the particular light emitting element 10 in the display screen. The essential criteria for the pulses produced by source 29 of FIG. 1 is that the pulse be positive going, have a predetermined and constant amplitude, and that it recur at the same relative time position during each successive frame interval. The same criteria hold generally for the pulses produced by erasing pulse source 27 with the difference being that the erasing pulses are negative going, and have a predetermined and constant amplitude different from and preferably larger than that of the storing pulses. The pulse source 27 produces an erasing pulse, during each frame interval, immediately before the storing pulse is produced by source 29. Various systems are well known in the art for producing synchronized timing or switching pulses of the type provided by sources 27 and 29. Specifically, one system for providing erasing pulses and charging pulses for actuating diodes switching devices is disclosed in detail in copending application Serial No. 747,799. It is to be understood that the pulse providing system there disclosed or other pulse source means having substantially the same functions can be utilized for providing keying pulses at the terminals *f* and *d* of the apparatus of FIG. 1.

Figure 2A:
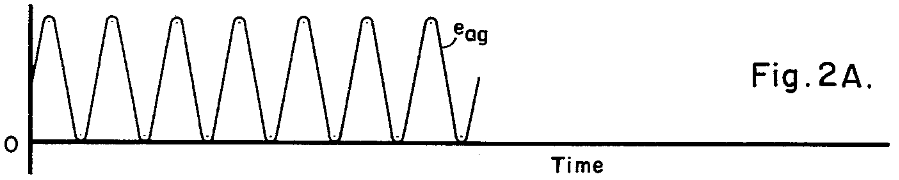
FIG. 2 is a plurality of voltage and current waveforms useful in explaining the operation of the system of FIG. 1.
Figure 2B:
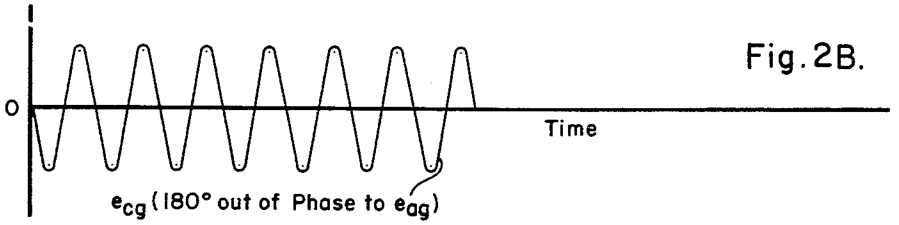

Operation of the systems of FIG. 1 is as follows. Alternating current power for energizing the cell 10 is supplied from sources 16 and 19. The sources 16 and 19 may be common to the whole image display screen with each elemental portion 9 of the display screen having a terminal *a* commonly connected to source 19 and having a terminal *c* connected to the source 16. The output waveforms of the sources 16 and 19 are relatively unimportant and sinusoidal waveforms are shown in FIGS. 2A and 2B only by way of example. The voltage applied to terminal *a* by source 19 is 180° out of phase with the voltage applied to terminal *c* from source 16. Accordingly, the periodic electromotive force $e_{ac}$ appearing between terminals *a* and *c* is substantially equal to the sum of the alternating current voltages produced by sources 16 and 19 plus the direct current component provided by the source 18. FIG. 2A shows the biased sinusoidal voltage appearing at terminal *a* with respect to ground and FIG. 2B shows the alternating voltage appearing at terminal *c* with respect to ground. The potential $e_{ac}$ at terminals *a* and *c* is applied across the series combination comprising nonlinear capacitive elements 12 and 14. The relative amplitudes of the periodic voltage sources 16 and 19 are adjusted to obtain approximate balance when the potential at point *p* does not contain a direct current component. That is, with the average direct current voltage at point *p* being zero, substantially all of the output voltage of source 19 appears across capacitive element 14 and substantially all the voltage of source 16 appears across capacitive element 12 so that the periodic potential $e_{pg}$ appearing across electroluminescent cell 10 is at a minimum value. The balance of voltage distribution between elements 12 and 14 is upset when a positive control signal component appears at point *p*. The capacitance of element 14 increases because the average direct current voltage thereacross is decreased. Conversely the capacitance of element 12 decreases because the average D.-C. bias thereacross is increased.

Figure 1A:
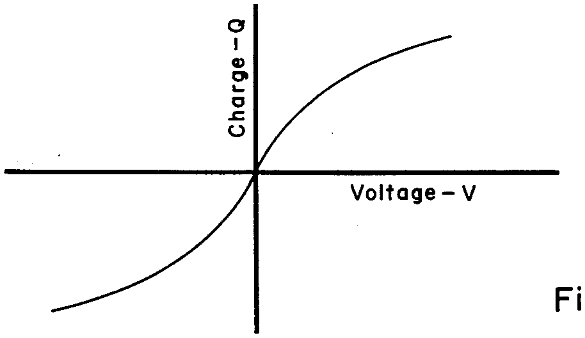
FIG. 1A is a curve illustrating the properties of a nonlinear dielectric capacitive element.
Figure 2C:
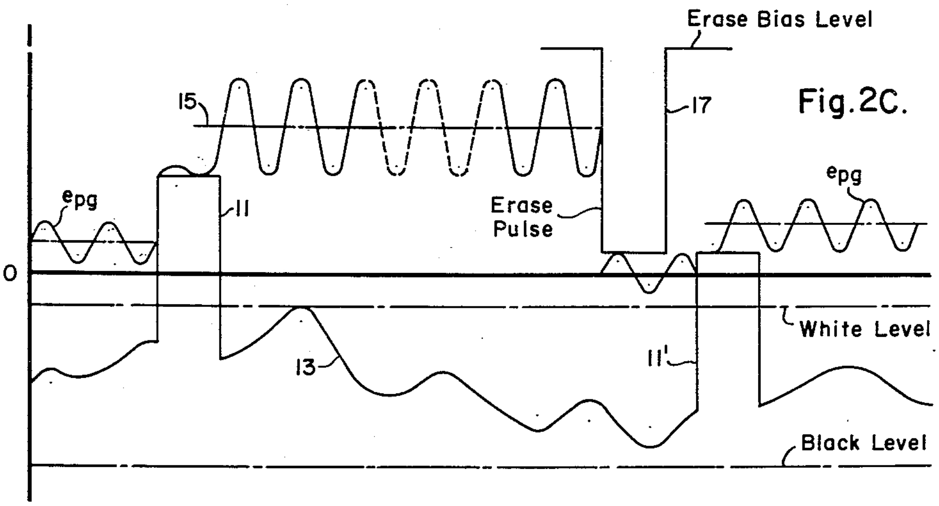

More specifically, and with reference to FIG. 2C, it may be observed that when the potential $e_{pg}$ across cell 10 has a small average or direct current value, the capacitive elements 12 and 14 respectively have alternating current potentials opposing the applied potentials from sources 16 and 19. Accordingly, the peak-to-peak periodic potential component of the potential $e_{pg}$ is relatively small. When pulse source 29 applies a positive going pulse 11 at terminal *d* the positive pulse 11 is additively combined with the contemporary amplitude of the video control signal 13 from source 28. The instantaneous sum of control signal 13 and positive pulse 11 is applied to the anode of storage diode 22 rendering it conductive and temporarily clamping the minimum instantaneous potential at point *p* to a direct current potential level corresponding to that instantaneous sum. With point *p* thus clamped at a more positive level, capacitive element 12 charges toward a higher level and the increased average field applied across capacitive element 12 decreases the dynamic capacitance thereof in accordance with the characteristic shown by FIG. 1A. As the dynamic capacitance of element 12 decreases the reactance thereof increases. Thus, as point *p* becomes more positive, the reactance of capacitive element 12 increases. Similarly, when the potential at terminal *p* is clamped at the new positive level the direct current potential across element 14 decreases. This is because the element 14 originally had the entire direct current potential of source 18 appearing thereacross with the point $a$ being held positive with respect to ground. When point $p$ is held positive it approaches the average potential of point $a$ thereby decreasing the average D.-C. voltage across capacitive element 14. Accordingly, the capacitance of element 14 increases in accordance with its nonlinear characteristic as shown by FIG. 1A, and its capacitive reactance decreases.

With the reactance of element 12 increasing and the reactance of element 14 decreasing the division of the alternating current potentials from sources 16 and 19 between capacitors 12 and 14 is altered with a substantially greater periodic voltage component appearing across capacitor 12 and with a relatively small periodic voltage component appearing across capacitor 14. The small alternating voltage component across capacitor 14 permits substantially all the alternating voltage from source 19 to be applied across cell 10. Thus, as shown in FIG. 2C, pulse 11 clamps the minimum value of the voltage at point $p$ to a positive level corresponding to the amplitude of video control signal 13 plus the amplitude of pulse 11. The alternating current component of potential $e_{pg}$ causes point $p$ to charge, during the negative going half cycle of the voltage at point $p$ until the average direct current voltage level of the point $p$ reaches a level 15 corresponding to the sum of control signal 13, the positive going pulse amplitude 11, and the peak value of the alternating component of $e_{pg}$. At this time capacitor 12 has a high impedance and the alternating current potential across it approaches the sum of the alternating current potentials provided by sources 16 and 19. Accordingly, the alternating current component of potential $e_{pg}$ has a maximum value, the peak-to-peak amplitude of which approaches the peak-to-peak amplitude of the potential provided by source 19. It is to be especially noted that for a given variation in video control potential level a considerably larger variation in potential stored across the nonlinear capacitive element 12 can be obtained by the system of this invention. Applicant's invention acts as a special kind of dielectric amplifier in that it shifts the level of point $p$ to an average potential 15 which corresponds not to the sum of control signal 13 and pulse 11, but rather to the sum of control signal 13, pulse 11 and the peak amplitude of the periodic voltage component appearing at point $p$.

Upon the termination of the positive going charging pulse 11 charging diode 22 is biased to a nonconductive condition by the negative voltage from source 26 applied to the anode thereof. Accordingly, the point $p$ is held at average potential level 15 for an entire frame time and the cell 10 is continuously energized to produce light in accordance with the peak-to-peak value of the alternating current portion of potential $e_{pg}$.

Figure 2D:
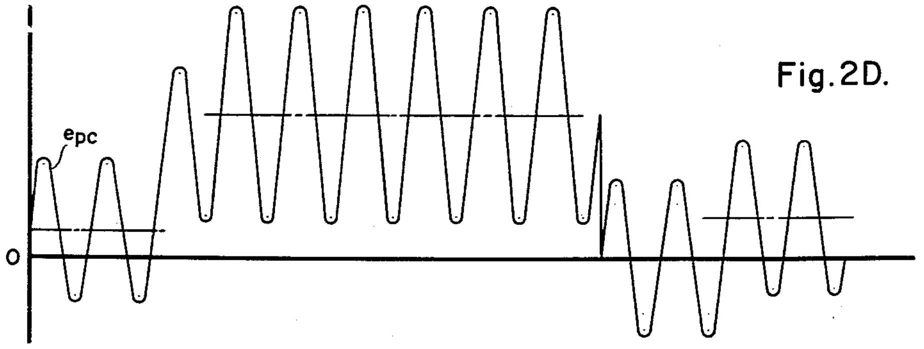

After the expiration of one frame period, when it is desired to reestablish the brightness of light emitting cell 10 in accordance with a new discrete portion of the video signal 13, a negative going erasing pulse 17 is applied from source 27 to the cathode of erasing diode 21 thereby rendering diode 21 conductive and clamping the maximum instantaneous potential at point $p$ to a lower potential level. The amplitude of the erasing pulse 17 is chosen to clamp the point $p$ so as to establish its direct current component equal to the reference potential level of point $g$. With point $p$ so clamped, capacitive element 14 is charged through diode 21 until the direct current voltage thereacross is equal to the bias potential provided by battery 18. With the average direct current potential across element 14 being thus increased the capacitance thereof is decreased in accordance with the characteristic shown in FIG. 1A and hence the capacitive reactance is increased. Similarly, with point $p$ being clamped by the erasing pulse 17 capacitive element 12 discharges until the direct current or average potential thereacross is zero. The removal of direct current bias from element 12 results in an increase in its capacitance and a corresponding decrease in its capacitive reactance. Accordingly, the capacitance elements 12 and 14 are returned to a balanced condition such that the alternating potential supplied by source 19 is dropped across element 14 and none of the same appears across cell 10. Likewise, the alternating potential provided by source 16 is dropped across capacitive element 12 and the voltage $e_{pg}$ appearing across electroluminescent cell 10 is substantially zero. Immediately following the termination of an erasing pulse 17 as shown in FIG. 2C, another charging pulse 11′, having the same amplitude and duration as the earlier charging pulse 11, is applied to the anode of charging diode 22 and the cycle of operation is repeated with the now conductive charging diode 22 clamping the minimum value of the voltage at terminal $p$ to a voltage level corresponding to the sum of the contemporary video signal amplitude and the charging pulse 11′. Accordingly, since the minimum amplitude of the voltage at point $p$ is clamped to a predetermined levels, diode 22 will conduct during the negative half cycle of the voltage from source 19 and will charge the capacitive elements 12 and 14 until the point $p$ reaches an average direct current voltage level corresponding to the sum of the contemporary video signal plus the charging pulse 11′ and the peak value of the alternating current component of potential $e_{pg}$. FIG. 2D illustrates the periodic potential appearing across capacitive element 12 during the various portions of the operating cycle shown in FIG. 2C. It is to be noted that during the time interval when $e_{pg}$ is at the voltage level 15 the potential $e_{pc}$ appearing across nonlinear capacitive element 12 is only slightly less than the sum of the absolute peak-to-peak alternating current potentials supplied by sources 16 and 19.

Figure 3:
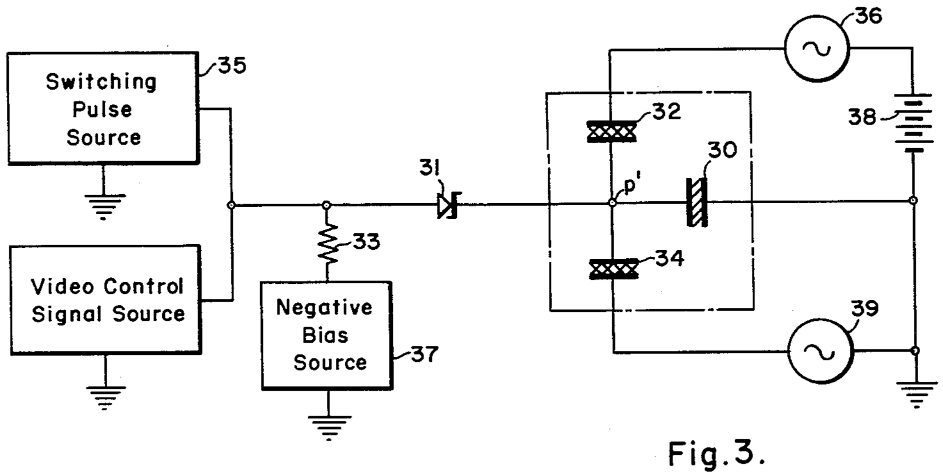
FIG. 3 is a schematic diagram of another circuit arrangement utilizing the principles of the present invention.

In FIG. 3 there is shown a second embodiment of a direct storage control circuit in accordance with the present invention. In FIG. 3 nonlinear dielectric capacitive elements 32 and 34 are similar to the elements 12 and 14 of FIG. 1 and are connected in circuit with an electroluminescent cell 30 and periodic current power sources 36, 39 in the same manner as the capacitive elements 12 and 14 are connected to the electroluminescent cell 10 and the sources 16 and 19 in FIG. 1. A power source biasing means 38 corresponding to the bias source 18 of FIG. 1 is connected serially with the periodic current power source 36 to the point of reference potential or ground. The system of FIG. 3 differs from that of FIG. 1 in that a single Zener diode 31 is connected between the video control signal input and the commonly connected electrodes of the capacitive elements 32 and 34. Biasing means comprising a negative voltage source 37 and a decoupling resistor 33 is connected to the anode of Zener diode 31 for maintaining it in a normally nonconductive condition. A single switching pulse source 35 is connected between the point of reference potential and the anode of diode 31 for applying both erasing pulses and charging pulses thereto. Pulse source 35 produces, at a predetermined time during each frame interval, a negative going erasing pulse immediately followed by a positive going charging pulse. The essential criteria for the pulses produced by source 35 is that the negative going erasing pulse should be of sufficient magnitude to cause the Zener diode 31 to conduct in the reverse direction in accordance with the known characteristics of such diodes, and the positive going or charging pulse should be of sufficient magnitude to overcome the negative bias provided by source 37 and to thereby render diode 31 conductive in the forward direction so that the minimum value of the voltage at common terminal $p'$ is clamped to a positive level corresponding to the sum of the video control signal amplitude and the positive charging pulse amplitude. The operation of the circuit of FIG. 3 is substantially the same as that of FIG. 1 with the functions of the various elements being the same as the functions of the corresponding elements in FIG. 1 with the exception that the Zener diode 31 provides both the erasing function of diode 21 and the charging function of diode 22 in the system of FIG. 1.

Figure 4:
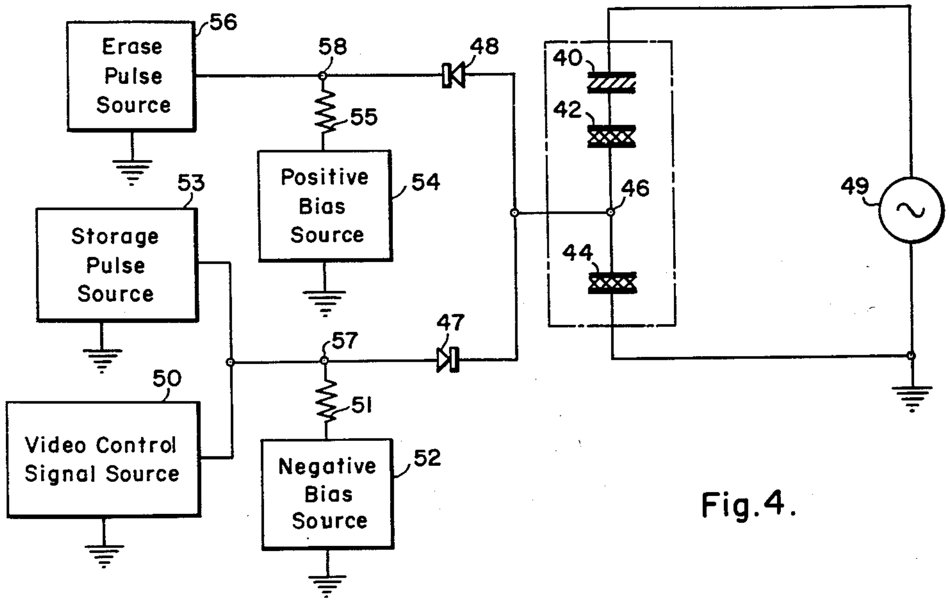
FIG. 4 is a schematic diagram partially in block form illustrating a system similar to FIG. 1 but utilizing, within the scope of the invention, a different interconnection of the nonlinear capacitive elements with the load element; and, FIGS. 5 and 6 are schematic diagrams of perfected variants utilizing the basic concepts and principles of the present invention.

FIG. 4 shows an additional embodiment of a signal storage and control system in accordance with the present invention. In FIG. 4 the right-hand portion of the diagram, including the diodes 47 and 48, the sources of biasing potential 52 and 54 and the pulse sources 53 and 56, is substantially similar to the corresponding elements of the system of FIG. 1. The apparatus of FIG. 4 differs from that of FIG. 1 in that the electroluminescent cell 40, the nonlinear dielectric capacitive elements 42 and 44 and a source of alternating current power 49 are coupled in a single series loop, with the common terminal of source 49 and capacitive element 44 being connected to a point of reference potential or ground, and with the commonly connected electrodes of the capacitive elements 42 and 44 being connected to an input terminal 46 which corresponds to the common terminal *p* of the circuit of FIG. 1. The electroluminescent cell 40 inherently has a much larger direct current leakage than does the nonlinear dielectric capacitive element 42. Accordingly, when the common terminal 46 is clamped to a positive potential level by the storing diode 47, the capacitive element 42 will be charged to the average direct current potential of terminal 46 and the electroluminescent cell 40 will retain substantially no direct current voltage component. It will be observed that when the average direct current potential of terminal 46 is zero, both of the capacitive elements 42 and 44 will have zero bias and accordingly will have maximum capacitance and minimum capacitive reactance. Accordingly a maximum portion of the alternating current potential from source 49 will be applied to the electroluminescent cell when point 46 is at average ground potential. The energization of cell 40 will decrease when point 46 is clamped and capacitive elements 42 and 44 are charged in response to the additive presence of a video control signal from source 50 and a storage pulse from source 53.

When a negative going erasing pulse is applied to positively biased terminal 58, erasing diode 48 will be rendered conductive and common terminal 46 will be so clamped that the average field across elements 42 and 44 will be zero and the reactance of elements 42 and 44 will be reduced to a minimum. Accordingly, the power delivered to luminescent cell 40 will approach a maximum, and maximum intensity light will be emitted. Immediately following the termination of the biased erasing pulse, a positively going charging pulse will be applied to terminal 57 additively with the negatively biased video signal. Charging diode 47 is rendered conductive, and the minimum value of the voltage at common terminal 46 is clamped to a potential level corresponding to the sum of the charging pulse amplitude and the contemporary amplitude of the biased video signal. With the minimum positive potential of common terminal 46 being so clamped, capacitive elements 42 and 44 are charged through storage diode 47, the capacitance thereof decreases and the reactance increases. Accordingly, a fraction of the periodic voltage wave from source 49 will appear across capacitive elements 42 and 44 corresponding to the contemporary amplitude of the video signal. Since the minimum positive potential of common terminal 46 is clamped and since an alternating current potential component is appearing across capacitive element 44, the elements 44 and 42 will be actually charged to an average direct current potential level corresponding to the sum of the video signal, the storing pulse amplitude, and the peak amplitude of the alternating voltage component across capacitive element 44. Thus, the shift in average potential level of the common terminal 46 is greater than the shift in video control signal level, with the amount of amplification being dependent upon the change in peak amplitude of the alternating current component appearing across capacitive element 44. The change in amplitude of that alternating current component is of course dependent upon the nonlinearity characteristic of the nonlinear dielectric capacitive element 44.

Figure 5:
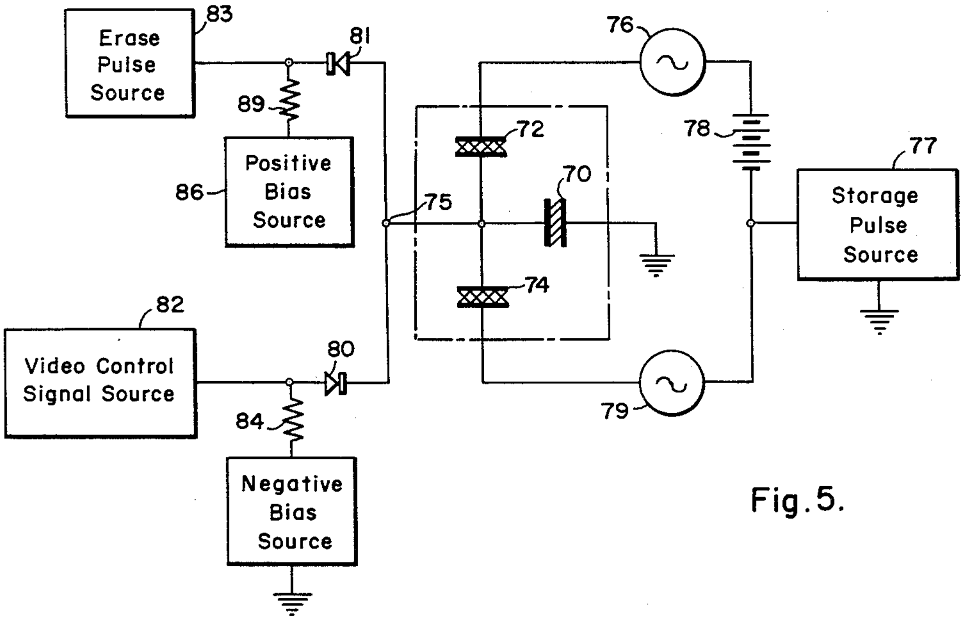

FIG. 5 illustrates a refined variant of the system of FIG. 1, in which the charging pulses for actuating storing diode 80 are applied between ground and the common terminals of sources 78 and 79. The storage pulses provided by source 77 in FIG. 5 are coupled through the periodic current power sources 76 and 79, and through the capacitances of elements 72 and 74 and applied to the cathode of diode 80. The storage pulse is negative going and has a predetermined amplitude which is of the same magnitude during each successive frame interval. The negative going charging pulse coupled by way of capacitive elements 74 and 72 to the common terminal 75 and the cathode of diode 80 renders the diode 80 conductive so that the minimum potential of point 75 is clamped to the direct current potential level of the negatively biased video control signal. Accordingly, electroluminescent cell 70 and elements 72 and 74, are charged to an average direct current potential level corresponding to the video signal level at the time of occurrence of the storage pulse. More exactly, cell 70 is charged, capacitive element 74 is charged and capacitive element 72, which was originally biased by the voltage of source 78, is partially discharged. Thus the capacitance of element 72 increases, the capacitance of element 74 decreases and the alternating current network is unbalanced to increase the peak-to-peak value of the alternating current component applied across cell 70. The light emitted from cell 70 is correspondingly increased. It will be apparent to those skilled in the art that the structure and operation of the embodiment illustrated in FIG. 5 is generally the same as the structure and operation of FIG. 1. The essential difference is that instead of applying a positively going storage pulse to the anode of the charging diode as in FIG. 1, a negative going storage pulse from source 77 is coupled by way of the capacitive elements 72 and 74 to the cathode of the charging diode 80. In all other respects the operation of FIG. 5 is the same as that of FIG. 1 and will be readily understood when a complete understanding of the system of FIG. 1 is achieved.

Figure 6:
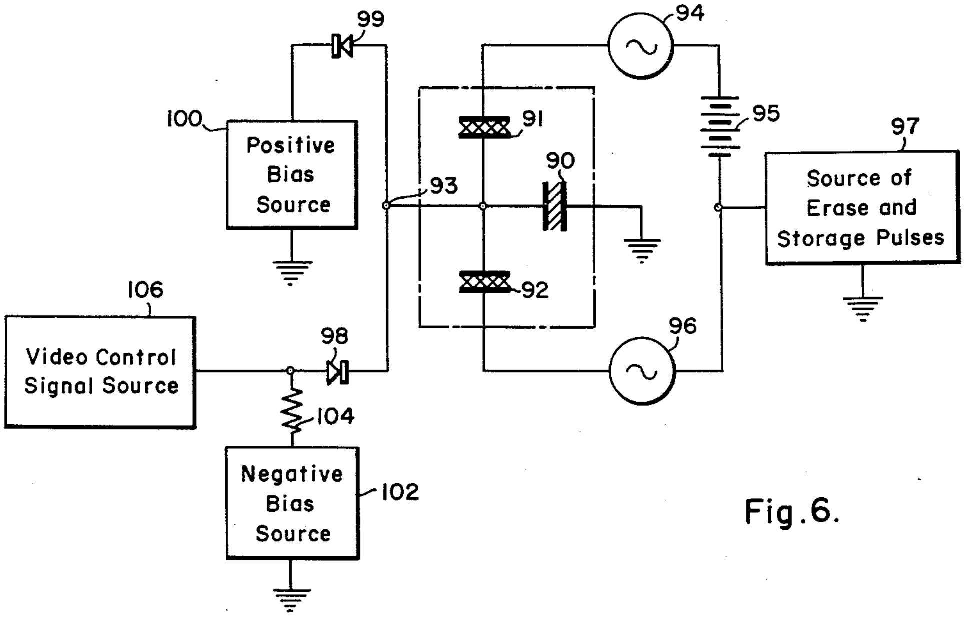

FIG. 6 illustrates a further refined variant of the system of FIG. 1, in which both the erasing pulses and the storing pulses are applied between ground and the commonly connected terminals of sources 95 and 96. In this embodiment the erasing pulses are positively going and are coupled through sources 96 and 94, and through capacitors 91 and 92 and by way of common terminal 93 to the anode of erasing diode 99. The immediately following charging pulses are negative going and are of fixed amplitude. The charging pulses are applied in the same manner as described with reference to FIG. 5 to the cathode of the storage diode 98. The structure of FIG. 6 is similar to that of FIG. 1 with the exception that no source of storage pulses is connected to the anode of the charging diode and no source of erasing pulses is coupled to the cathode of the erasing diode 99. Rather a single source 97 is connected between ground and the negative terminal of bias source 95. During the erasing pulse interval, source 97 operates to shift the average direct current potential of sources 94 and 96 to a predetermined positive level, thereby driving current through capacitive elements 91 and 92 and through erasing diode 99 to charge common terminal 93 to an average positive potential corresponding to the amplitude of the erasing pulse. During the immediately following signal storage interval, the negative going storing pulse is coupled through elements 91 and 92 to the cathode of diode 98, thereby rendering diode 98 conductive and clamping terminal 93 to the contemporary potential level of the negatively biased input control signal. With common terminal 93 being so clamped, the average direct current potentials across capacitive elements 91 and 92 are altered in the same manner as heretofore described with reference to FIG. 1 and the impedances of elements 91 and 92 are correspondingly altered to establish an alternating current potential component across cell 90 which corresponds to the contemporary amplitude level of the input control signal.

The embodiments of FIGS. 5 and 6 are believed to be particularly advantageous in that they enable the use of a single pulse distributor 97 for sequentially applying pulses to a large plurality of elementary networks of the type shown by FIG. 6. For example, the pulse source 97 of FIG. 6 may comprise a pulse delay line constructed in accordance with practices well known in the art and may be either distributed or lumped parameter LC delay line network structures. Such a delay line may be provided with pulse inputs from a flip-flop circuit or the like, and may be provided with a plurality of outputs along its electrical length so that a pulse applied to the input is sequentially produced at the various outputs at a predetermined rate. Alternatively the pulse sources 97, for a large plurality of networks in accordance with FIG. 6, may comprise a plurality of amplitude sensitive pulse generators sequentially activated by saw tooth or similar voltage waveforms which is sequentially stepped from one of the pulse generators to the next.

While the present invention has been shown in certain embodiments only, it will be obvious to those skilled in the art that it is not so limited but is susceptible of various changes and modifications without departing from the spirit and scope thereof.

I claim as my invention:

1. In an electrical system employing a control signal and pulse signals, load means to be variably energized in accordance with the amplitude of sampled portions of said control signal, at least one nonlinear dielectric capacitive element having first and second electrodes and exhibiting an alternating current impedance which varies as a function of applied electric field, a source of periodic current power having an output voltage which includes an alternating component, means for apportioning the alternating component of said voltage to said element and said load means in accordance with their relative impedances, at least one nonlinearly conductive switching device having first and second terminals with said first terminal connected to said first electrode, means for applying said control signal to said second terminal, means for nonconductively conditioning said switching device, means for maintaining the average direct-current potential of said second electrode at a reference potential level so that the periodic potential variations of said first electrode relative to said level depend upon the relative impedances of said elements and said load means, and means utilizing said pulse signals for recurrently charging said capacitive element to an average value of applied electric field in accordance with a function of said control signal.

2. In an electrical system employing a control signal and pulse signals for recurrently sampling said control signal, load means to be variably energized in accordance with the amplitude of sampled portions of said control signal, at least one nonlinear dielectric capacitive element having first and second electrodes and exhibiting an alternating current impedance which varies as a function of the average value of an applied periodic electric field, a source of periodic current power having an output voltage which includes an alternating component, means coupling said element and said load means with said source for apportioning the alternating component of said voltage to said element and said load means in accordance with their relative impedances, at least one nonlinearly conductive switching means having first and second terminals with said first terminal connected to said first electrode, means for applying said control signal to said second terminal, bias means for nonconductively conditioning said switching means, means for maintaining the average direct-current potential of said second electrode at a predetermined reference potential level so that the average potential of said first electrode relative to said level corresponds to the average electric field applied to said element and so that the periodic potential variations of said first electrode relative to said level depend upon the relative impedances of said element and said load means, and means utilizing said pulse signals to actuate said switching means for recurrently charging said capacitive element to an average value of applied electric field in accordance with a function of the amplitude of said control signal whereby the impedance of said element is modified in accordance with sampled portions of said control signal and said load means is thereafter energized in accordance with said modified impedance.

3. In an electrical system, a source of intelligence bearing signal, a source of periodic current power having an output voltage which includes an alternating component, means for modulating said output voltage in accordance with variations in amplitude of said intelligence bearing signal, said means comprising at least one nonlinear dielectric capacitor characterized by exhibition of alternating current impedance which varies as a function of instantaneous potential thereacros, power utilization means coupled in series with said capacitor across said source of power, and means including a nonlinearly conductive switching device connected between said source of intelligence bearing signal and said capacitor for recurrently charging said capacitor to a potential corresponding to an instantaneous amplitude of said intelligence bearing signal.

4. In an electrical system employing time spaced pulse signals, a source of intelligence bearing signal, a source of periodic current power having an output voltage which includes an alternating component, means for modulating said output voltage in accordance with variations in amplitude of said intelligence bearing signal, said means comprising at least one nonlinear dielectric capacitor characterized by exhibition of alternating current impedance which varies as a function of instantaneous potential thereacross, power utilization means coupled in series with said capacitor across said source of power, and means including a nonlinearly conductive switching device connected between said source of intelligence bearing signals and said capacitor and responsive to said pulse signals for recurrently charging said capacitor to a potential corresponding to an instantaneous amplitude of said intelligence bearing signal whereby the delivery of power from said power source to said utilization means is recurrently adjusted as a function of the amplitude of said intelligence bearing signal.

5. In combination, a source of control signal; a source of periodic current power having an output voltage which includes an alternating component; a source of time spaced pulse signals; load means to which said periodic current power is to be applied in accordance with the amplitude of selected portions of said control signal; at least one nonlinear dielectric capacitive element having first and second electrodes; means for distributing the alternating component of said output voltage to said element and said load means in accordance with their respective impedances; nonlinearly conductive switching means having first and second terminals for controlling application of said control signal to said capacitive element, with said first terminal being directly connected to said first electrode; means for applying said control signal to said second terminal; means for biasing said switching means to a nonconductive condition; a point of reference potential; means for maintaining the average direct current voltage of said second electrode at the potential level of said point so that the potential of said first electrode with reference to said point corresponds to the instantaneous charge stored by said capacitive element; and means utilizing said pulse signals for conductively conditioning said switching means to charge said capacitive element to a direct-current potential level dependent upon the instantaneous amplitude of said control signal at the time of occurrence of said pulse signals.

6. In combination, a source of intelligence bearing control signal; a source of periodic current power having an output voltage which includes an alternating component; a source of time spaced pulse signals; load means to which said periodic current power is to be controllably applied in accordance with the amplitude of a selected time spaced portions of said control signal; at least one nonlinear dielectric capacitive element having first and second electrodes; means coupling said element, said load means, and said power source in an alternating current conductive loop for distributing the alternating component of said output voltage to said element and said load means in accordance with their respective impedances; nonlinearly conductive switching means having first and second terminals for controlling application of said control signal to said capacitive element, with said first terminal being directly connected to said first electrode; means for applying said control signal to said second terminal; means for normally biasing said switching means to a nonconductive condition; a point of reference potential; means connected between said second electrode and said point of reference potential for maintaining the average direct-current voltage of said second electrode at the potential level of said point so that the potential of said first electrode with reference to said point corresponds to the instantaneous charge stored by said capacitive element; and means utilizing said time spaced pulse signals for conductively conditioning said switching means to charge said capacitive element to a direct-current potential level dependent upon the instantaneous amplitude of said control signal at the time of occurrence of said pulse signals.

7. In an electrical system, a source of time varying and intelligence bearing control signal, a source of periodic current power, a source of time spaced pulse signals, a periodic current power utilizing load element to be continuously energized during the time intervals between said spaced pulses with the energization power level during each of said intervals being proportional to the amplitude of said control signal at the beginning of the same interval, a nonlinear dielectric capacitive element having first and second electrodes with said first electrode being connected to one terminal of said load element to form a series combination therewith, means coupling said power source to said second electrode and to the other terminal of said load for dividing the periodic output voltage of said power source between said capacitive and load elements in accordance with their respective reactances, means having a low impedance to direct current connected between said second electrode and a point of reference potential for maintaining the average potential of said second electrode substantially at the reference potential level of said point so that said first electrode periodically varies in potential by a peak-to-peak amount dependent upon the reactance, a nonlinearly conductive switching device having first and second terminals with said first terminal conductively connected to the first electrode of said capacitive element, means for biasing said device to a nonconductive condition, means for applying said intelligence bearing control signal to the second terminal of said device, and means utilizing said time spaced pulse signals for recurrently rendering said switching device conductive to charge said capacitive element to an average direct-current potential level dependent upon the instantaneous amplitude of said control signal whereby said load element is thereafter energized in accordance with said potential level.

8. In an image display apparatus in which an electroluminescent cell is coupled in series with at least one nonlinear dielectric capacitive element to a source of periodic current power so that energization of said cell is controlled by division of the output voltage of said source between said cell and said element in accordance with the relative reactances thereof, a source of varying amplitude intelligence bearing control signal, a source of time space pulse signals, a nonlinearly conductive switching device having first and second terminals with said first terminal conductively connected to the common junction of said cell and said capacitive element, means for biasing said switching device to a nonconductive condition, means for applying said control signal to said second terminal, and means for utilizing said time spaced pulse signals to recurrently alter the relative potentials of said first and second terminals and render said switching device conductive whereby said capacitive element is charged to a direct-current voltage level dependent upon the instantaneous amplitude of said control signal and said electroluminescent cell is thereafter energized in proportion of said level.

9. In an electrical system including a plurality of load elements for utilizing periodic current power and in which the amount of power delivered to each of said elements is to be independently controlled, a source of periodic current power, a plurality of nonlinear dielectric capacitive elements, means individually connecting a separate one of said capacitive elements in series combination with each of said load elements and to said source of power so that the output voltage of said source is distributed between the elements of each series combination in accordance with the reactances thereof and so that each series combination is provided with a junction terminal common to one electrode of each element of the series combination, a source of control signal of continuously varying amplitude, a plurality of nonlinearly conductive switching devices each having first and second terminals with the first terminal of each being conductively connected to the junction terminal of an individual one of said series combination, means for normally biasing said devices to a nonconductive condition, means for applying said control signal to the second terminals of said switching devices, a source of time spaced pulse signals, means utilizing said pulse signals for sequentially rendering said switching devices conductive to sequentially charge said capacitive elements to different average direct-current voltage levels corresponding to the respective amplitudes of said control signal at the times of occurrence of said time spaced pulse signals whereby each of said load elements is thereafter energized with periodic current power in accordance with the average direct-current charge of the associated capacitive element.

10. In a system for distributing video signals in response to periodically recurrent pulse signals, a source of video signals, a nonlinear dielectric charge storage device, switching means conductively connected between said source and said device and adapted to be triggered by said pulse signals for conducting said video signals to charge said storage device in accordance with instantaneous values of said video signal means for providing electrical energy including at least an alternating voltage component, and means for applying a portion of said component, said pulse signals and said video signals additively across said switching means so that said charge storage device is charged to a level dependent upon the instantaneous value of said video signal and further dependent upon the differential change in effective capacitance of said charge storage device which is caused by charging of said device toward said level.

11. In an electrical system which includes a plurality of load elements for utilizing alternating current power and in which the amount of power delivered to each of said elements is to be independently controlled at least one nonlinear dielectric capacitive element associated with each of said load elements and exhibiting capacitance which varies as a function of an applied control voltage, means providing time varying potential connected in a circuit with each said load element and its associated capacitive element for applying time varying potential across said control and load elements in proportion to their respective impedances, means for applying an electrical control signal to each said capacitive element so that the power delivered to said load element is varied in accordance with the magnitude of said control signal, said last mentioned means comprising a nonlinearly conductive switching device having first and second terminals with said second terminal being conductively connected to one electrode of said control element, means applying said control signal to said first terminal for continuously varying potential thereof as a function of said control signal, means for providing time spaced pulse signals, means applying said pulse signals across said switching device in additive relation with said control signal and the time varying potential appearing across said control element so that said switching device is rendered conductive to charge said capacitive control element to an average direct-current potential corresponding to the amplitude of said control signal at the time of occurrence of one of said pulse signals.

12. In an electroluminescent image display apparatus a source of video signals, a source of alternating current, a plurality of electroluminescent elements physically arranged to form a planar image display screen with each of said elements being adapted to emit light in accordance with alternating potential applied thereacross, a plurality of series combinations each including a ferroelectric capacitor connected in series with a different one of said elements, means connecting said series combinations in parallel across said source of alternating current to energize each of said elements in accordance with the admittance of the capacitor connected in series therewith, a plurality of pulse actuable switch devices with a different one of said plurality being connected between said source of video signal and each of said ferroelectric capacitors for selectively limiting the maximum instantaneous charge of said capacitor to a level corresponding to an instantaneous amplitude of said video signal, a source of pulse signals and means responsive to said pulse signals for sequentially actuating said switch means whereby said capacitors are individually charged in accordance with different time sequential portions of said video signal.

13. In an image display apparatus employing video signals and time spaced pulse signals, a source of time varying electrical power, a plurality of light emittive units for utilizing said power, each of said units including an electroluminescent element and at least one nonlinear dielectric capacitive means electrically connected in series with said element and said source so that the light emitted by said element is dependent upon the effective capacitance of said means, a nonlinearly conductive diode having first and second terminals with said first terminal being conductively connected to one electrode of the capacitive means of one of said units, means for applying said video signals to said second terminal, and means for utilizing said pulse signals to recurrently alter the potential of said first terminal relative to that of said second terminal so that said diode is rendered conductive to charge said capacitive means to an average direct-current potential level corresponding to the instantaneous amplitude of said video signal at the time of occurrence of said pulse signals.

References Cited in the file of this patent

UNITED STATES PATENTS

| | | |
|---|---|---|
| 2,875,380 | Toulon | Feb. 24, 1959 |
| 2,905,830 | Kazan | Sept. 22, 1959 |
| 2,917,667 | Sack | Dec. 15, 1959 |
| 2,922,076 | Sack | Jan. 19, 1960 |